(12) United States Patent
Slone

(10) Patent No.: US 7,134,404 B2
(45) Date of Patent: Nov. 14, 2006

(54) SHELTER FOR SMALL ANIMALS AND PETS

(76) Inventor: Margaret Slone, 15161 Burbank Dr., Glen Ellen, CA (US) 95442

( * ) Notice: Subject to any disclaimer, the term of this patent is extended or adjusted under 35 U.S.C. 154(b) by 0 days.

(21) Appl. No.: 10/762,631

(22) Filed: Jan. 21, 2004

(65) Prior Publication Data

US 2004/0149236 A1    Aug. 5, 2004

Related U.S. Application Data

(60) Provisional application No. 60/442,590, filed on Jan. 24, 2003.

(51) Int. Cl.
*A01K 1/03* (2006.01)

(52) U.S. Cl. ........................ 119/501; 119/498

(58) Field of Classification Search ................ 119/482, 119/498, 501, 161; 206/521, 523, 591, 592–593; 220/592.2, 592.25, 23.91, 23.9, 529.23, 23.87, 220/62.2, 62.22, 62.19; 52/33, 144, 302.7, 52/309.4
See application file for complete search history.

(56) References Cited

U.S. PATENT DOCUMENTS

| | | | | | |
|---|---|---|---|---|---|
| 1,889,184 | A | * | 11/1932 | Siemers | 449/30 |
| 2,811,298 | A | * | 10/1957 | Jones | 229/240 |
| 2,979,246 | A | * | 4/1961 | Liebeskind | 206/523 |
| 3,236,206 | A | * | 2/1966 | Willinger | 119/203 |
| 3,946,944 | A | * | 3/1976 | Keyes et al. | 126/620 |
| 4,803,952 | A | * | 2/1989 | Houser | 119/499 |
| 5,184,568 | A | * | 2/1993 | Healey | 119/482 |
| 5,383,422 | A | * | 1/1995 | Morris | 119/499 |
| 5,575,239 | A | * | 11/1996 | Bradburn et al. | 119/500 |
| 5,895,310 | A | * | 4/1999 | Otomo et al. | 449/1 |
| 6,758,167 | B1 | * | 7/2004 | Edelinski | 119/498 |
| 6,886,495 | B1 | * | 5/2005 | Madden et al. | 119/482 |

FOREIGN PATENT DOCUMENTS

BR    9804272    *   6/1998

* cited by examiner

*Primary Examiner*—Teri Pham Luu
*Assistant Examiner*—Kimberly S. Smith
(74) *Attorney, Agent, or Firm*—Edward S. Sherman

(57) ABSTRACT

A novel animal shelter or habitat is constructed from substantially rigid foam insulation for protecting a small pet from extreme temperatures outdoor or in semi-protected locations. The habitat preferably comprises side walls, a roof and floor constructed from rigid foam board, and has an appropriately sized portal on one side to minimize heat loss, thus providing for rapid warming and comfort via the retention of the animals own body heat.

19 Claims, 8 Drawing Sheets

SHELTER FOR SMALL ANIMALS AND PETS

CROSS REFERENCE TO RELATED APPLICATIONS

The present application claims priority to provisional application having Ser. No. 60/442,590, entitled Feline Habitat and filed on Jan. 24, 2003, which is incorporated herein by reference

BACKGROUND OF INVENTION

The present invention relates to an animal shelter and more especially to an animal shelter that is suitable for felines and other small pets, protecting them from temperature extremes.

Currently available pet shelters did not adequately protect cats and other small pets from the effect of temperatures in cold environments. Such protection is desirable also in so called temperate climates because even there, the temperature outdoors frequently falls below the average person's refrigerator temperature which is about 38–42 degrees F. Many small animals that live unprotected in extreme low temperature climates experience discomfort and have an increased the risk of cold related illnesses and shorter life spans.

Further, many small pets are adverse to involuntary confinement or the use of artificial shelters that are provided by the owner, as felines have a natural desire to define their own territory frequently inhibits them from leaving a pre-existing territory, despite physical discomfort and enter or remain in an unfamiliar shelter In light of the aforementioned risks to small pets and the unsuitability of prior art pet shelters there exists a need for a low cost pet shelter or habitat that encourages small pets to enter and to adjust a new environment. Accordingly, the desirable pet shelter should be adaptable to changing seasons and climates year round, as well as being sufficiently light weight to provide portability.

It is thus an object of the present invention to provide a shelter for small pets that is portable, being of light weight; such that it is easily moved to favored locations depending upon the climates, season and the animal's territory and viewing preferences.

As a further object of the attention to provide such a shelter that is easy to clean and wash from time to time, yet at low cost.

SUMMARY OF INVENTION

A feline habitat in the form of a hollow shell or container is constructed of rigid foam insulation and has a sufficiently small opening such that the animal's body warmth is sufficient to heat the chamber under cold conditions that may be experienced on a covered porch, unheated garage or other semi-protected area. The animal is first attracted to the habitat due to its cushioned upper surface, which serves as a convenient perch, and eventually a leaping target. Accordingly, after feeling secure on the perch, the feline becomes intrigued with the new object, and ultimately sufficiently emboldened to enter, thus appreciating its comfortable insulating properties. The habitat further provides a secure and safe shelter from large predators.

A feline habitat consisting of two living quarters to serve, day and night and through all the seasons of the year, the feline's environmental needs pertaining to temperature, comfort, and instinct. The interior living quarters becomes substantially and measurably warmer with a feline inside because their body heat warms the interior space. The interior living quarters serves their comfort needs further because of the soft pillow provided inside the chamber. The interior living quarters meets the feline's instinctive need for a secluded nesting area. The top level living quarters meets the feline's instinctive need for an elevated viewing perch; the soft pillow affixed to the top provides a lofty daybed.

In the preferred embodiment structure has an outer covering that protects the foam from climbing and clawing, yet is light enough to be relocated until the viewpoint from the upper surface or perch first attracts the feline or other small pet to enter the habitat structure. The above and other objects, effects, features, and advantages of the present invention will become more apparent from the following description of the embodiments thereof taken in conjunction with the accompanying drawings.

BRIEF DESCRIPTION OF DRAWINGS

FIG. 3A is a perspective view of the habitat in FIG. 1 display features of the entry or portal side as well as the upper surface of the habitat, without optional cushions in place. FIG. 3B Exploded at the cross-section defined by reference line 3B–3B' Illustrate one embodiment for securing the cushion to the habitat via a fabric cover.

FIGS. 7A, 7C and 7E are cross-sectional elevations whereas FIGS. 7B, 7D and 7F are the respective corresponding exterior elevations.

DETAILED DESCRIPTION

In accordance with the present invention, a feline habitat in the form of a hollow shell or container is constructed primarily from a tubular section of solid foam insulation material by combining one or more rigid foam boards as either the top or bottom surface of the tubular structure. The tubular structure may also be constructed from either rigid foam boards or other foam shapes with a cross-section that is of either circular, conical or rectangular cross-section, or the like. The chamber has a sufficiently small opening, defining an entrance side, such that the feline's body warmth is sufficient to heat the chamber interior to at least about 50° F. when the exterior temperature is circa 32° F. (freezing), or other cold conditions that may be experienced on a covered porch, unheated garage, basement or other semi protected area.

Figure 1:
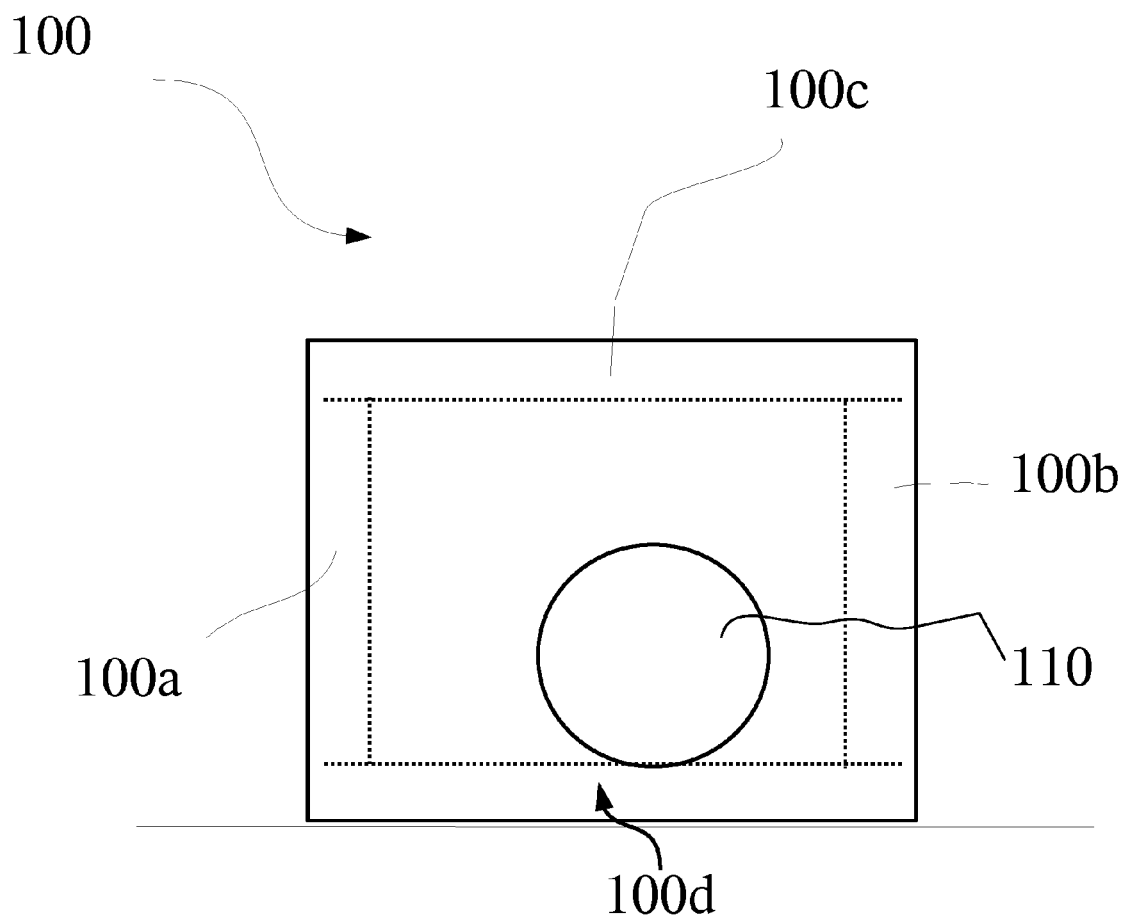
FIG. 1 is an elevation view of a first embodiment of the inventive habitat

FIG. 1 is an elevation of the first embodiment of the inventive habitat 100 viewed from the entrance side. In this embodiment the habitat 100 is substantially rectangular having an opening or entry portal 110 that defines the front side of the habitat. The entry portal 110 need not be spherical as illustrated, but preferably has at least one side or edge near the internal floor of the habitat, illustrated by the dashed lines above bottom surface 100d. Note that the thickness of interior walls, 100a and b, as well as roof and floor, 100c and 100d (as defined by the distance between the dashed lines, representing the interior surface, and the solid lines, representing the external surface) are considerably massive, having a thickness of about 1" to ¾" thick in a preferred embodiment. As the walls are preferably constructed from rigid foam insulation, a material having voids entrained within, they provide both thermal insulation and structural support to the habitat.

Figure 2:
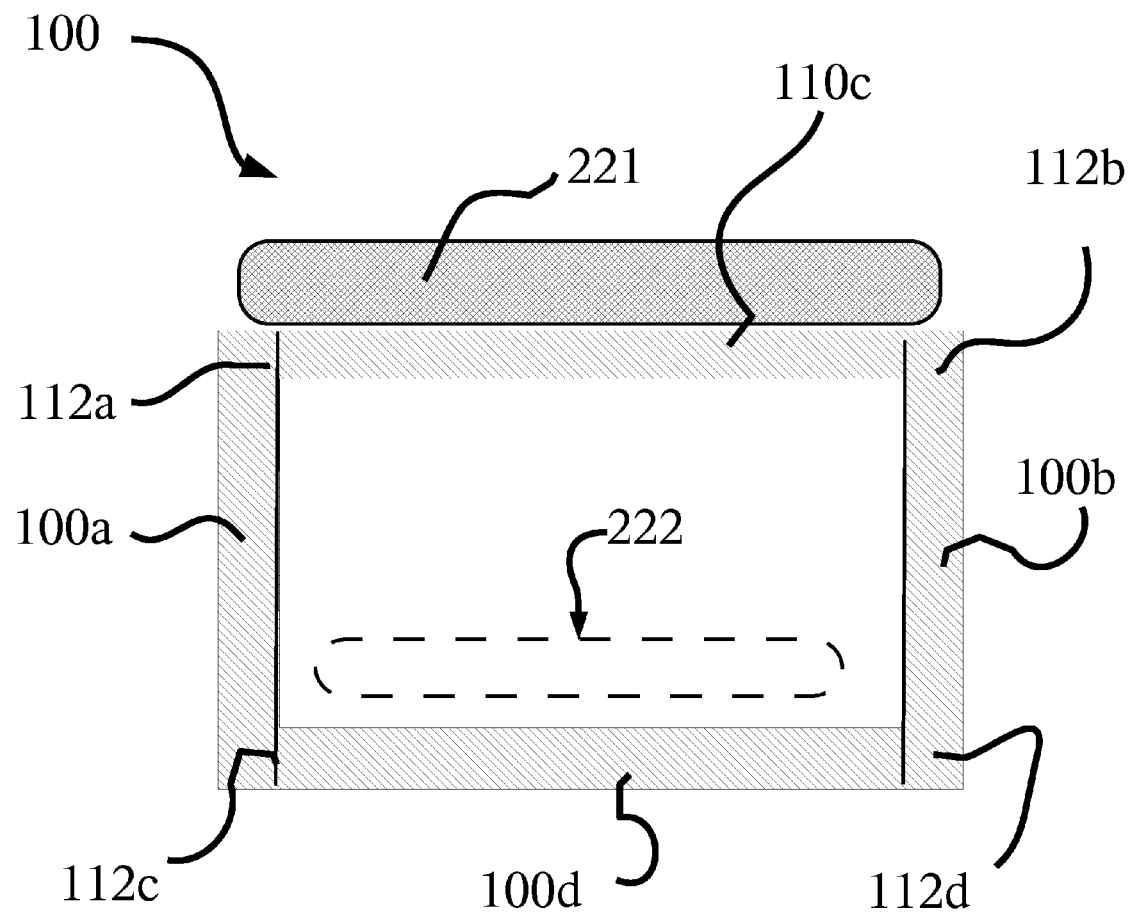
FIG. 2 is elevation exposing the cross-section of the inventive habitat of FIG. 1 to illustrate the placement of optional cushions.

FIG. 2 is a cross-sectional illustration for the inventive habitat 100 in FIG. 1, providing further details of the method and materials of construction. The habitat is preferably constructed from rigid sheet of insulating foam, 110a, 110b for the walls, and 110c and 110d for the roof and floor respectively. The foam is cut into discrete sheets or panels that are glued to internal edges 112a, 112b, 112c and 112d. The currently preferred insulating material is cut from molded (or otherwise fabricated) expanded polystyrene foam insulation, which is available in either planar boards or wide variety of alternative shapes and sizes.

As will be discussed further below, the design and construction of the habitat from rigid foam insulation provides numerous benefits, in addition to low construction cost. Such insulating foam is typically easy to wash or clean with soft, damp towel, as are optional protective covers described with respect to additional embodiment of the invention. Further, numerous types of foam insulating materials are available which are non-toxic and environmentally friendly. Although these insulating materials are generally not intended for use as a structural or load bearing elements in the general construction industry, their deployment in the habitat avoids other structural members, and thus enables a light weight and portable structure; easily moved to favored locations depending upon climates, season, as well as the small pet's preferences.

FIG. 2 illustrates optional cushions, which among other function, enhance the retention of the animal's body heat. The previously described insulating foam structure of FIG. 1 is adapted for receiving at least on of a first optional cushion 201 in the interior of habitat, and an optional second insulating cushion 202 placed on the upper surface. The more preferred embodiment being the use of both an interior and exterior cushions.

The deployment of the upper cushion is preferred to help the small animal overcome any natural tendency to avoid such structures. In the case of the feline, the pet is first attracted to the habitat by the cushioned upper surface, which serves a compelling perch for viewing as well as an extra soft daybed, meeting a cat's natural desire to be in a lofty warm and comfortable position. Thus the split-level design using both optional cushions encourages the feline to first become enamored with the top level bed. Accordingly, after feeling secure on the cushioned top level bed or cushion, the feline becomes intrigued with the new object, and ultimately sufficiently emboldened to enter the interior chamber and discover the additional warmth available. As this interior chamber constitutes the second sleeping area for use, especially during cold temperatures; the animal learns to seek shelter therein, having earlier appreciate the rapid temperature elevation it senses on entering this chamber.

Not wishing to be bound by theory, it appears that the uncovered insulating foam on the interior side walls of the chamber provide the animal with a rapid and dramatic sensation of warmth which may be attributed to the novel structure. Further, by wholly constructing the habitat from foam insulation the interior wall surface have a low thermal mass and increase in temperature rapidly once a pet or animal enters. Hence, a the pet upon entering an otherwise cold structure notices a heat increase very quickly, perhaps within less than about 10 seconds of entry, as the temperature of the insulating foam inner surface rising quickly, along with the air inside the habitat, from about 32 degree ° F. to 50 degrees ° F., merely from the body heat of the creature.

Thus the small pet can make their own choice from day to night, season to season, as well as from moment to moment, about the temperature of their own sleeping/resting environment; either the cushioned top level bed for daytime and warm spring/summer nights; or the interior chamber bed for the cold days and nights of fall/winter since the interior quickly becomes substantially and measurably warmer than the outside temperature.

Also by constructing a small compact habitat from rigid insulation board a light weight and portable structure of sufficient structural strength can be fabricated inexpensively.

Figure 3A:
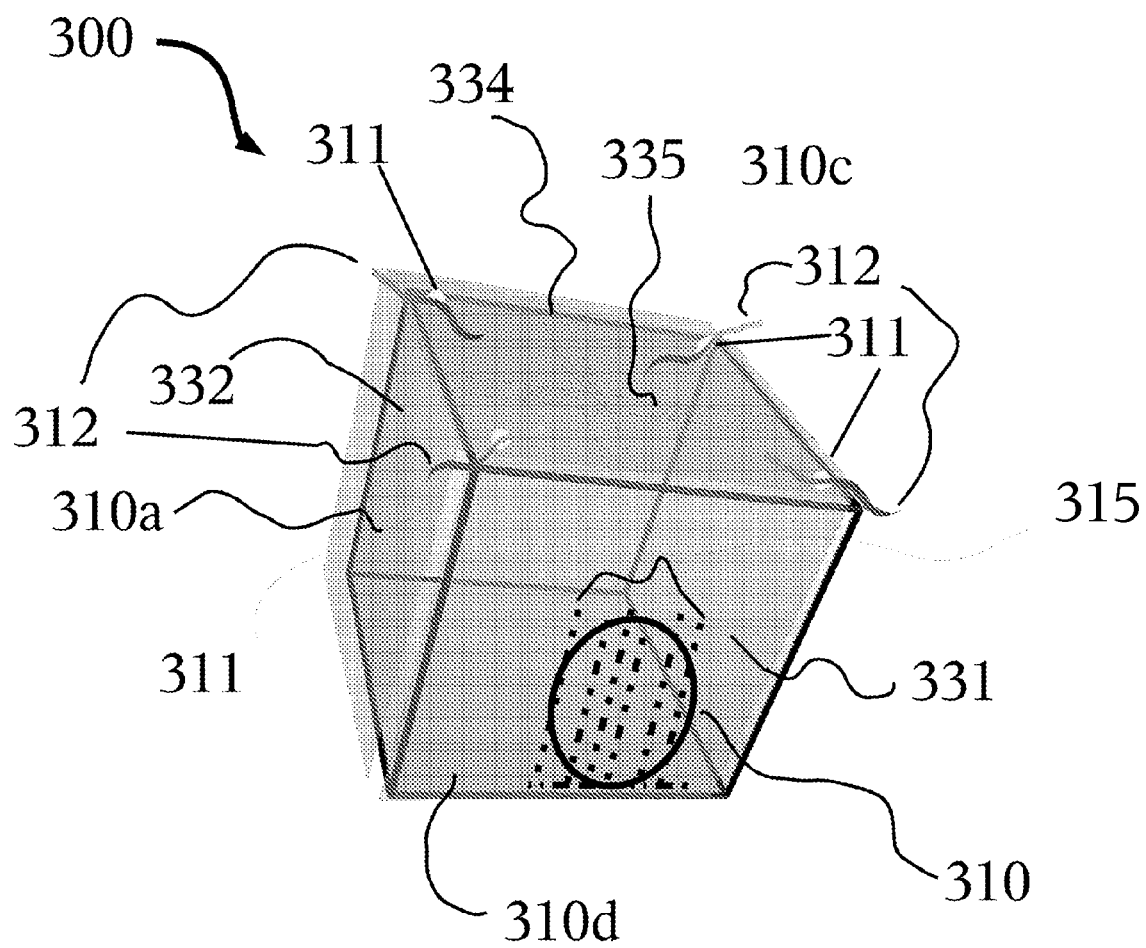
FIGS. 3A and 3B illustrate alternative views of another embodiment of the rectangular habitat of FIGS. 1 and 2 further comprising protective cover and related structures for securing the upper cushion.
Figure 3B:
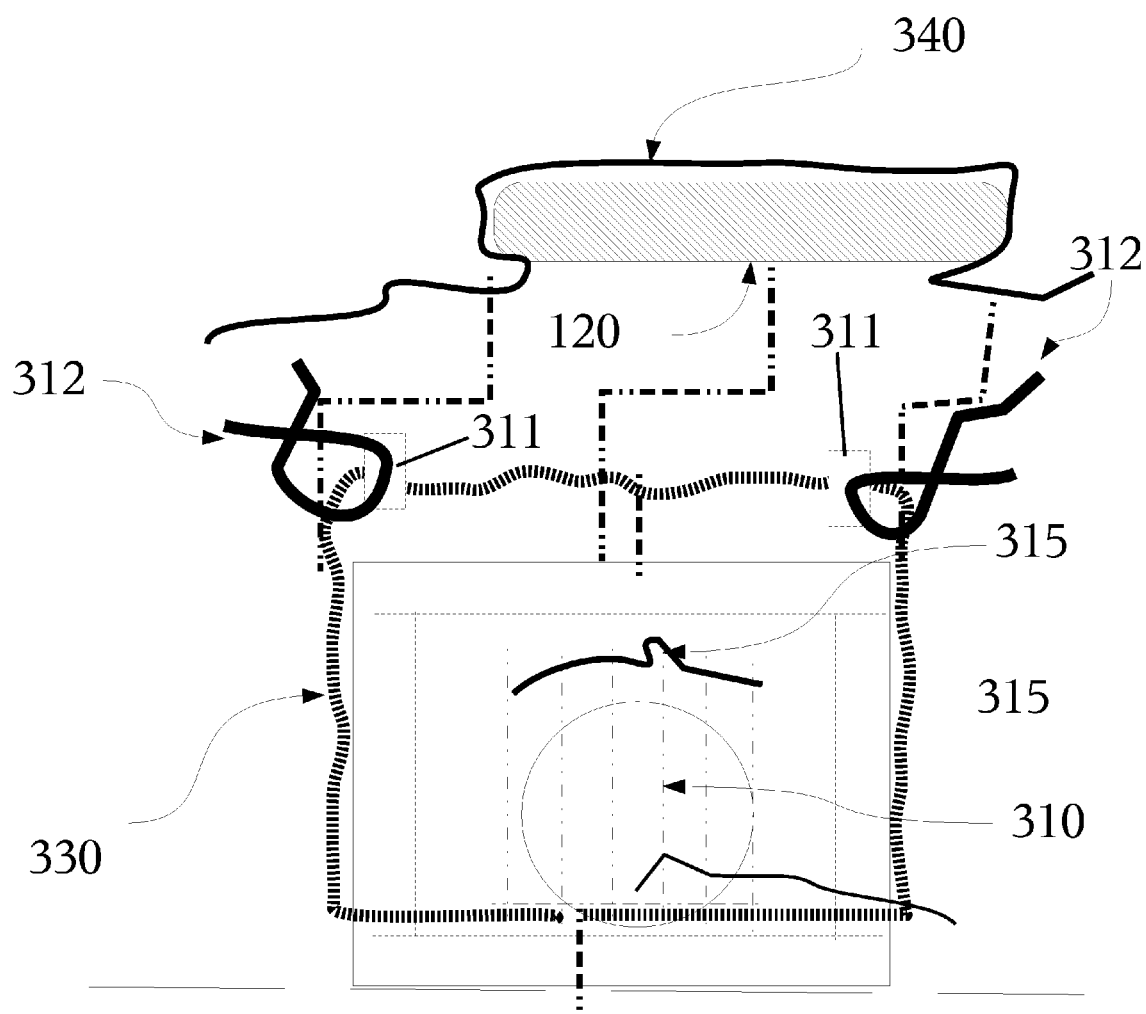

The construction of another preferred embodiment is illustrated in FIGS. 3A and 3B. FIG. 3A is a perspective view of the habitat in FIG. 2 as observed from the entry or portal side to display the upper surface and entry side of the habitat. This perspective view omits the optional upper cushion to illustrate the placement and attachment of an optional protective cover (formed from plastic or vinyl sheet wrapped around the outer surfaces of the structure.)

FIG. 3B is an exploded plan view of a cross-section taken at reference line 3B–3B' in FIG. 3A to illustrate the placement of the cushion, a protective fabric and a preferred means for securing the cushion to habitat 300 via a protective cover 330.

The outer covering protects the foam from damage during climbing or clawing by the pet. In a preferred embodiment to outer cover is also used to secure the upper cushion in place. The protective cover in FIG. 3 is fabricated from two vinyl sheets having a width that correspond to the outer dimension of the habitat, and are preferably of a sufficient length to be wrapped around 4 adjacent sides. Thus in a more preferred embodiment top surface 310c of habitat 300 is covered with a double layer of the vinyl sheet material whereas a single layer of the sheet covers each the side surfaces. Furthermore, the short edges of the vinyl sheets 331 and 332 are preferably disposed to overlap at the top surface 310 of the protective habitat 300, where each of the two vinyl sheets each preferably adhere to the opposing side of the same vinyl sheet by one or more adhesive tape strips 334 (connecting edges of vinyl sheet 331) and 332 (connecting edges of vinyl sheet 332) which are diagonally disposed to each other, as numerous grades of commercial adhesive tape 334 and 335 having good adhesion to vinyl surfaces. Furthermore, the four side edges that extend form top surface 310c to bottom surface 310d may also be sealed with adhesive tape strips, leaving about a 2" gaps to provide for optional securing straps, fasteners or other fasteners described below.

As illustrated in FIG. 3A a series of holes numbered 311 penetrate both of the overlapping sheets proximal to each of the four corners of the upper surface 310c of the habitat 300.

A ribbon, string or band 312 can be tied to secure the two pieces of vinyl sheeting together, largely avoiding the use of adhesive or other fasteners directly to the foam boards, or other insulating structural members. Advantageously this construction maintains the structural and thermal insulating integrity of the rigid foam material.

Further, these connecting ribbons provide a preferred means for securing the upper cushion in place, while still leaving the cushion, and an optional fabric cover, easily detachable for removal and cleaning. Thus the ribbons 311 or other connectors can be used to secure the upper cushion by detachable mechanical connection, including, without limitation, inserting the ribbon through corresponding holes or fastener loops attached to the corners of the cushion.

Opposite ends of each of ribbons 311 can be tied by extending one end over the corner of the structure, and the other end of the ribbon through the dual hole such that the ribbons is under both of the sheets of material that fully cover the top of the habitat. Alternatively, as further illustrated in exploded cross-sectional view FIG. 3B, a decorative fabric sheet 340 having a larger area than the cushion can be draped around the cushions edges with the excess fabric bundled together and inserted through the loops defined by tying the ends of ribbons 312, thus detachably securing both the fabric sheet 340 and the cushion to the top of the habitat. Alternatively, clips, snaps, zippers, "VEL-CRO™" type closures and the like type fasteners may be connected to holes 311, or corresponding connection points previously formed in the protective vinyl sheets, so as to secure the fabric sheet and or cushion together on top of the habitat As shown in FIG. 3B, this provides a single layer of the vinyl sheet material on each side face, including the front of the entry portal. Thus by slitting selected portions of the vinyl along the dashed lines over the entry portal side that are enclosed within reference bracket 315 a protective entry screen is optionally formed This protective entry screen is preferred as it further prevents heat loss, yet permits as well as encourages the animal to enter the shelter, as the light weight strips offer little or no resistance to the force exerted by the pet entering the habitat.

Figure 4:
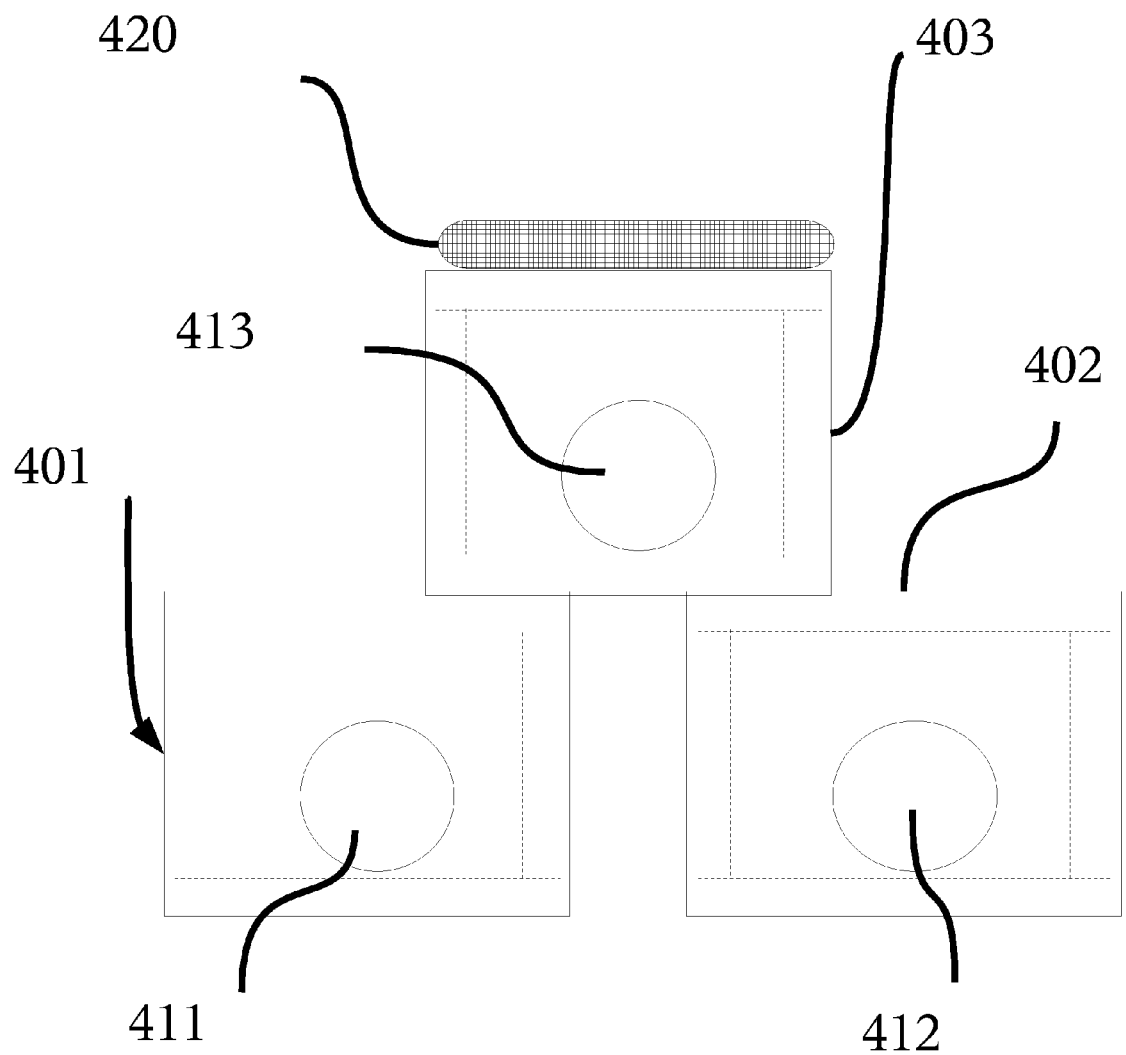
FIG. 4 is an elevation of an arrangement for several of the inventive habitat previously illustrated in FIGS. 1 through 3.

FIG. 4 is an elevation view showing one configuration for stacking multiple habitats 401, 402 and 403, each having respective entry portals 411, 412 and 413. In this stacked configuration, the upper cushions had been removed from lower habitats 401 and 402. The suitability for this configuration may be enhanced by providing additional features or structures, such as supporting stands to raise the lower habitats off the ground to meet the feline's instinctive need to be in an elevated position, thus providing an opportunity to exercise by leaping either into or on top of their respective habitats. It will become obvious to one ordinary skill in the art that fabricating the habitats in FIG. 4 with interlocking mechanical features on the top and bottom surfaces facilitates the stacking via overlapping the edges as shown in the FIG. 4, and is also applicable to stacking the habitats by vertically aligning the side walls of the upper and lower habitat. As it is desirable to secure or fasten such stacked habitats to the walls or other vertical structures, holes formed within the top of the flexible protective cover, described above with reference to FIGS. 3A and 3B, as well as the openings between the flexible protective covers (disposed on the 4 vertical edges of the habitat where the outer surface of the foam insulation is optionally exposed) provide a convenient location for attaching strap, as well as other mechanical connectors.

Figure 5:
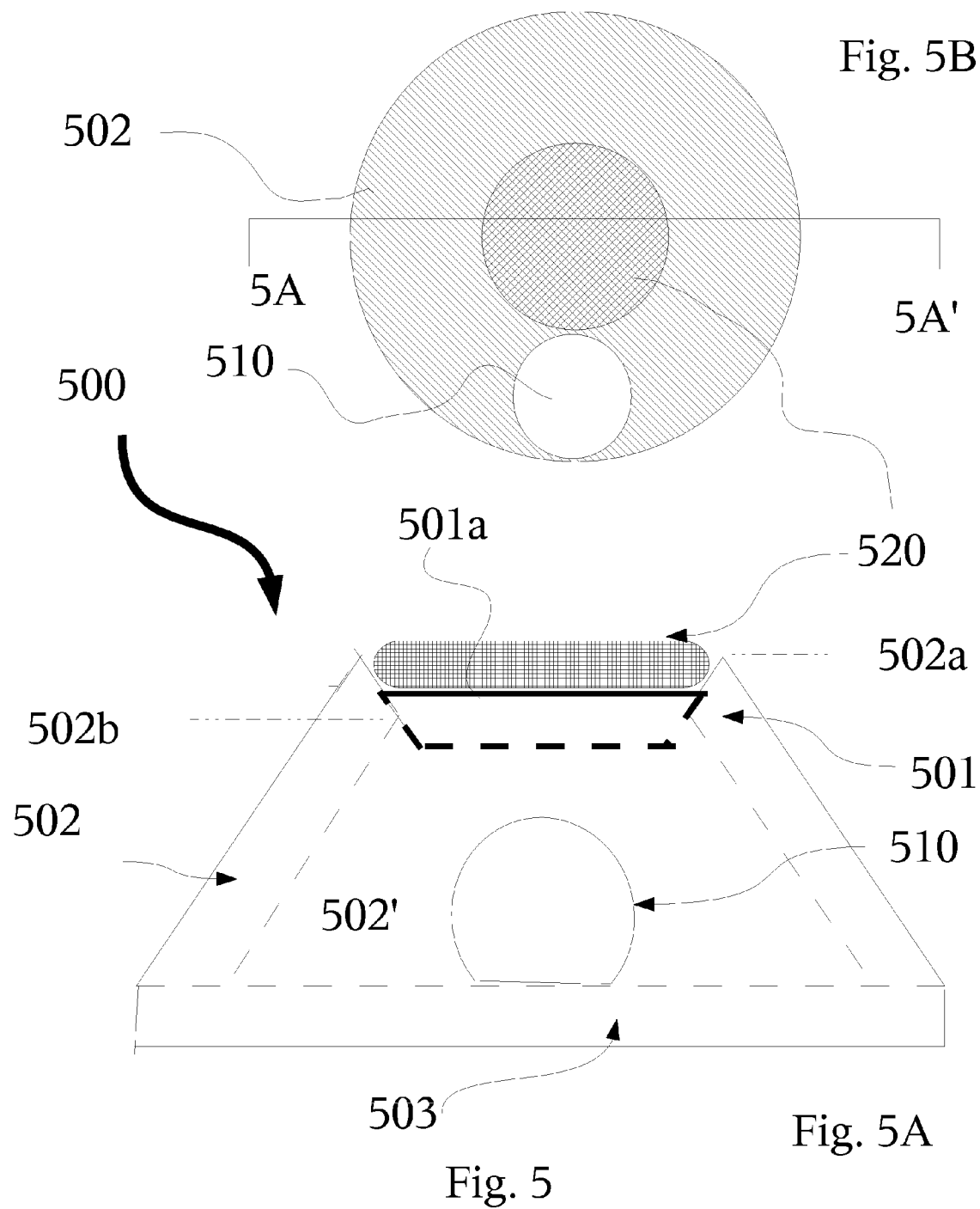
FIGS. 5A and 5B illustrate respectively plan and cross-section views of one embodiment of a nonrectangular habitat

FIGS. 5A and 5B illustrate an alternative insulating habitat having either a conical or semi-spherical shape similar to an igloo. FIG. 5A is a plan view from above the habitat showing the larger circular base of insulating material 511 that forms a floor, a roof 512 formed from a circular panel and an entry portal 510 penetrating the sloping side surface 502 of habitat 500. The otherwise exposed outer surfaces of the foam insulating material are optionally protected by an outer cover. The slope of side surface 502 are preferably linear, having a single axis of curvature, such that the habitat comprises a section of a cone, as this facilitates the fabrication and attachment of an optional flexible cover, which is wrapped and connected to itself at an angle so as the form a conical shape, as further described below with reference FIGS. 6A and 6B. However, side surface 502a alternatively has convex curvature to provide an igloo shaped habitat.

FIG. 5A is a cross-section of habitat 500 in FIG. 5B taken through line 5A–5A' for illustrating various optional features of this embodiment. An upper cushion 520 is readily secured by providing an upper roof surface 501a recessed slightly below the upper edge 502a of side wall 502. The diameter of cushion 200 is less than the diameter of the opening in habitat 500 at side edge 502a. This recess is formed by extending the edges side walls above a substantially round aperture wherein roof 501 is formed from a circular panel is inserted below side edge 502a, but held in place by contact with the smaller diameter opening defined by the upper edge 502b of inner side wall 502' disposed below outer wall side edge 502a. Thus the circular panel 501 can be permanently attached to side wall 502 along surface 502c, but otherwise provides a removable roof as an additional feature. Roof panel 501 is preferably an insulating sheet like side wall 502. Further, the insulating bottom floor 503, like the roof 501 is optionally detachable from side wall 502, but can also be permanently adhered to side wall 502 using any commercially available adhesive side compatible with polystyrene or the plastic material used to form the side walls.

Figure 6A:
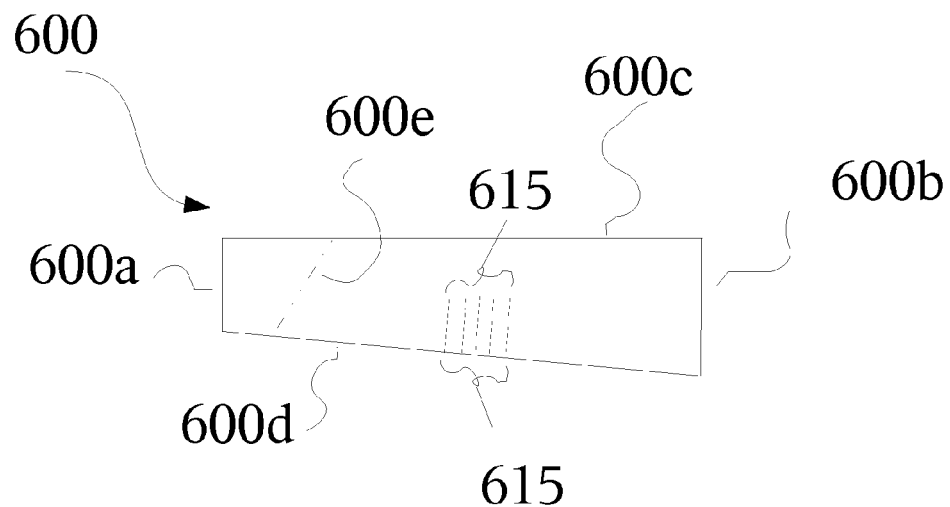
FIGS. 6A and 6B illustrate respectively plan and perspective views of one embodiment of the protective cover for the conical habitat of FIG. 5.

FIG. 6A illustrate in plan view of a section of vinyl or other sheet material for forming a protective cover over the conical section shaped habitat in FIG. 5A.

Figure 6B:
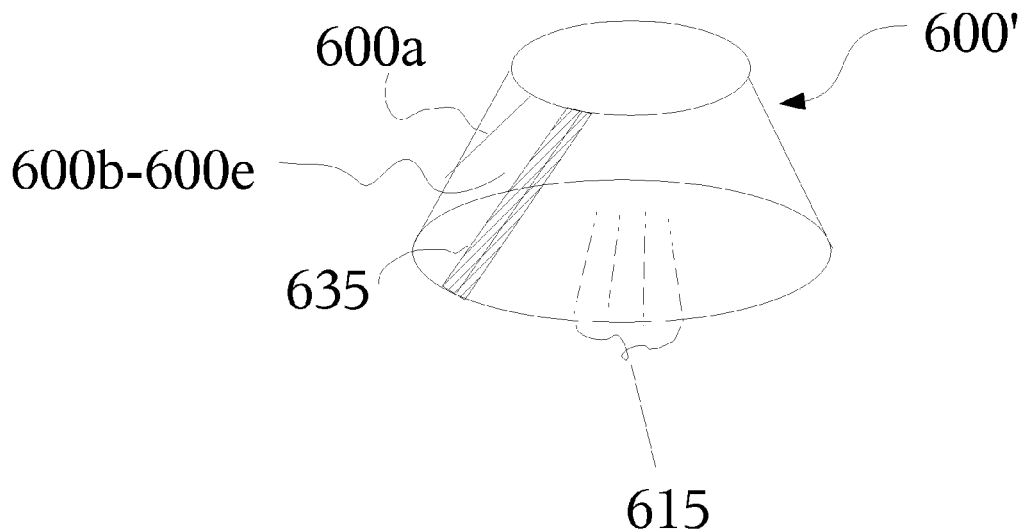

Sheet 600 is a 4 sided polygon having long non-parallel but opposing sides 600c and 600d, and substantially shorter opposing sides 600e and 600d, as shown in FIG. 6A. Sheet 600 is wrapped to form the conical surface in FIG. 6B by overlapping sides 600a and 600b at an angle that determines the cone angle by bringing edge 600b into alignment with reference line 600e. The point of overlap is labeled 600b–600e in FIG. 6B. As shown in FIG. 6B adhesive tape 635 secures these overlapping edges together. Additionally, otherwise free edge 600a can be attached to the inside surface of sheet 600 by adhesive tape. The adhesive tape can be replaced by other joining methods, including but not limited to riveting, sewing, ultrasonic welding, and the like. Accordingly, the portion of the vinyl sheet in front of the entry portal can be the removed or slip as in the rectangular configuration in FIG. 3. Thus, assembled outer cover 600' in FIG. 6b is readily slipped over the top of habitat 500 from the narrower top. Accordingly, cover 601' is readily secured to habitat 500 by virtue of a slip fit by matching there respective cone angles and dimension of sheet 600 to the length of side 502 of habitat 500. Flexible cover 600' has either an opening to correspond to the location of portal 510 on side surface 502 of habitat 500 or, as shown, is optionally slit along the dashed lines labeled by bracket with reference number 615 to form a series of deformable insulating flaps. An alternative to vinyl sheeting as protection for foam walls 502 is a shell or structural material disposed on the outer surface of sidewalls 502 as either an integral part of the insulating material or in lamination thereto.

FIGS. 7A, 7C and 7E are cross-sectional elevations for another embodiment of the invention for schematically illustrating the three primary assembly thereof. Each of the horizontally adjacent FIGS. 7B, 7D and FIG. 7F are the corresponding exterior elevations of the same stages of assembly.

Accordingly, FIG. 7A illustrates the four of the six rigid foam panels that provide the insulating properties to habitat 700. FIG. 7B illustrates the sixth panel 706 as having the circular hole 710 that forms a portion of the entrance portal of habitat 700. The external portion of habitat 700 is formed from a box 720 that has opening flaps 721 and 722 as illustrated figure 7C. The opening flaps 721 and 722 fully expose the interior of the box 720 permitting the insertion of foam panels 701, 702, 703, 704 and 706, as well as the fifth panel, which is not illustrated. The fifth panel corresponds to the dimensions of panel 706, but generally does not include the circular hole 710. In order to form the assembly shown in FIG. 5C rigid foam panels 704 is first inserted into the bottom of the box 720 to form at least a portion of the floor of habit. Rigid foam panel is may cover the full width and length of the inside bottom of the box but is preferably dimensioned so as to accommodate the vertical side panels being inserted between the side walls of the box and the vertically disposed edge of a horizontally disposed bottom panel 704. Next the four side panels (which includes panels 701,703, and 706) are inserted flush against the inside vertical wall of box 720 resting on the bottom panel 704, and secured in the upright or vertical position being wedged between the internal surfaces of the sides of the box and panel 704. As illustrated in FIG. 7d the illustrated side 720a of box 720 has a circular hole 723 constructed to form the external portal to the habitat. Accordingly, rigid foam side panel 706 is inserted into box 720 such that hole 710 is aligned with the corresponding and generally circular hole 723 on side 720a. The last of the four side foam panels is inserted flush against the inside surface of the box on the face opposed to sided 520a. The vertical dimensions of the side panels deliberately shorter than the height of box 720 such that the last of the six foam panels rests on the edges of the side panels 501 and 502 when inserted into box 720, forming the insulated roof of the habit. Thus, after all six foam panels are inserted and secured to the interior walls of box 720 the opening flaps 721 and 722 are folded down, as illustrated by the arrows in FIG. 7C, to form the completed habitat, as illustrated in FIGS. 7E and 7F. It should be appreciated that flaps 721 and 722 are optionally sealed together by numerous means such that they remain in place covering the upper surface of rigid foam panel 702. Further, it should be apparent that that the placement of circular hole 710 in panel 706, and the corresponding circular hole 723 in side 720a of box 720, closer to one edge of face 720a can define the intended bottom of the enclosure, provided the foam panels are otherwise secured so the assembly final enclosure 700 can inverted, as well as rotated by 90 degrees. Although flaps 721 and 722 of box 720 would be disposed in contact with supporting surface if the enclosure is inverted it is still desired that they are sealed with tape, adhesive, staples and the like. In addition, the box can also be closed by providing an extra length of flap that folds so that it can be tucked between the foam panel and the interior of the box. Such flaps may also be formed into a self interlocking assembly, as is known in the art of constructing storage boxes, such as "Banker Boxes" and the like.

Figure 7:
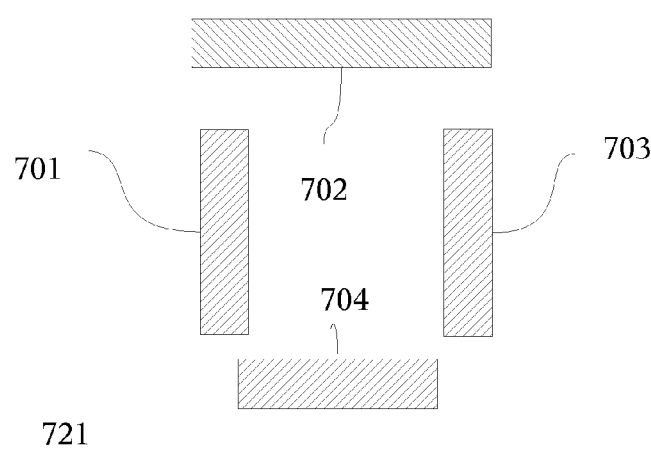
FIGS. 7A–F are elevations schematically illustrating stages in the assembly of a preferred embodiment of the invention.
Figure 7:
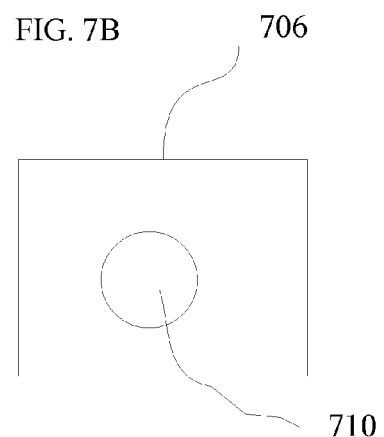
Figure 7:
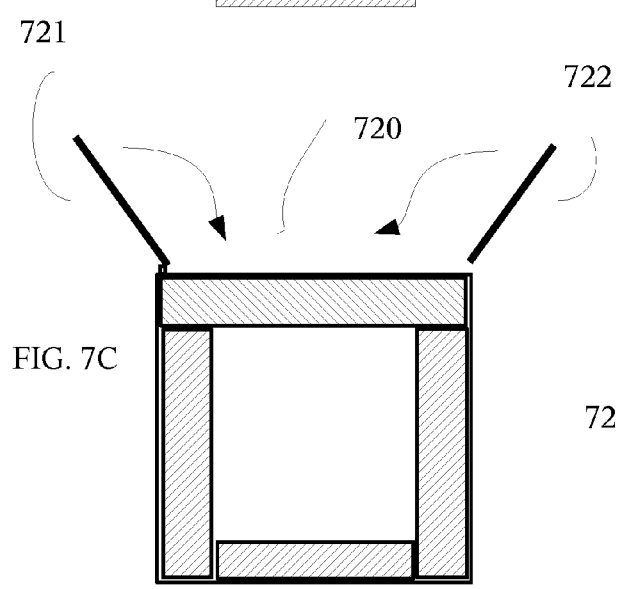
Figure 7:
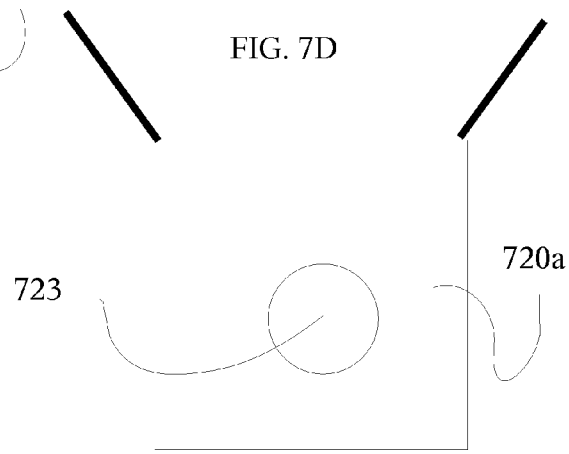
Figure 7:
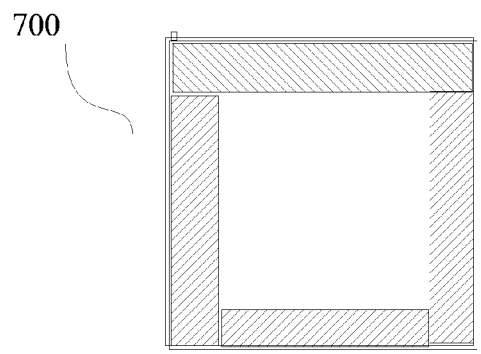
Figure 7:
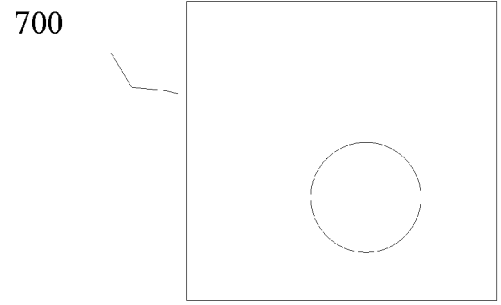

The box 720 used to form the exterior of habit 700 in FIG. 7F may comprise conventional cartons formed of paper fiber paper-based corrugated board. As it is desirable to be able to clean the habitat with water or use it outside of a sheltered are the preferred embodiment utilizes corrugated plastic sheeting having comparable dimensions to ordinary corrugated paper fiber based cardboard. Such plastic board being generally waterproof is easier to clean and more durable. If it should be apparent that the protective entry screen, formed by slitting the flexible plastic sheeting, as shown in FIG. 3, need not cover the entire habitat, but can be limited to the approximate dimension of the entrance portal by conveniently attached it either the cardboard exterior of box 720 to cover portal 723, or the foam board 706 that forms the interior wall of the completed habitat, that is over hole 710. The protective entry screen can be attached with adhesive tape, glue, mechanical fasteners, hook and loop "VELCRO" type fasteners, and the like. Further, the flexible sheeting, interior and exterior cushions described with respect to other embodiments are fully compatible for combination with habitat 700 in FIG. 7. The habit in FIG. 7 optionally includes a short pipe like section with a flange portion to cover the inside edge of the hole 710 cut in the foam panel, particularly at the outside interface with the exterior wall of the box where it engages the corresponding hole 723.

It should be appreciated that the dimensions and strength of the rigid foam panels used to form the side and upper surface of the box 720 are selected such that the assembled habit 700 is strong and durable enough to sustain the impact and weight of the small pet perched on the upper exterior surface thereof. The rigid foam panels can be secured within box 720 by a snug compression fit, adhesive tape, glue, mechanical fasteners, hook and loop "VELCRO" type fasteners, and the like.

With a feline inside any of the habitats structure and equivalents disclosed herein, even the air inside is warmed for comfortable breathing. The habitat thus protects felines from severe temperatures, prevents their discomfort in cold weather, and reduces their risk of cold-related illnesses and shortened life spans caused by living unprotected in extreme weather conditions. This unit is essential even in temperate climates because even there, the temperature outdoors falls frequently below the average person's refrigerator temperature which is 38–42 degrees F.

Furthermore, the various embodiment described herein generally appear to appeal to an indoor cats as well, as the feline species exhibits a natural desire to acquire their own territory for both physical and emotional comfort. Thus, even cats that are permitted to live indoors readily adopt the inventive habitats, consistent with an appreciation of their ability to choose their favorite temperature at the moment. Further, indoor cats will frequently choose the interior chamber because of their natural inclination toward warmth, especially when homes are left unheated during the middle of the day when the owners are generally away.

Another embodiment of the invention is a kit for constructing an animal shelter. The kit comprises a prefabricated panel plastic based corrugated board adapted to be formed into a box having a least one portal on a portion of a side surface. The kit also comprises a plurality of substantially rigid foam boards having dimensions corresponding to the inside dimensions of each of the surface of the box to be formed from the prefabricated plastic panel. At least one panel has a hole formed therein which corresponds with the shape of the side of the box having the at least one portal.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

A novel animal shelter or habitat is constructed from a substantially rigid foam insulation for protecting a small pet from extreme temperatures outdoor or in semi-protected locations. The habitat preferably comprises side walls, a roof and floor constructed from rigid foam board, and has an appropriately sized portal on one side to minimize heat loss, thus providing for rapid warming and comfort via the retention of the animals own body heat. The rigid foam insulation on a side surfaces is preferably protected by an overlapping layer of vinyl sheet material. The construction provides for securing cushions or pillows over at least one of the interior or exterior horizontal surfaces, the cushion providing additional warmth and comfort so that the feline or other small pet readily adapts to the structure as their permanent habitat.

The invention claimed is:

1. An insulated animal shelter comprising:
   a) a box having at least one flap opening to expose the interior cross-section of said box, with an opening formed in one side of said box,
   b) a plurality of substantially rigid foam panels disposed on each interior surface of said box,
      i) wherein the panel disposed adjacent to the opening on one side of said box has a corresponding opening that forms an entrance and exit portal for the insulated animal shelter,
      ii) wherein an animal sheltered inside said box is exposed directly to the foam insulating material without an intervening barrier, and
   c) a curtain covering the entrance and exit portal that is a sheet of flexible plastic having a sequence of vertical slits to form a sequence of narrow flexible drapes.

2. An insulated animal shelter according to claim 1 and further comprising a cushioning material disposed on an upper surface of said box.

3. An insulated animal shelter according to claim 2 wherein the box is fabricated from folded plastic based corrugated board.

4. An insulated animal shelter according to claim 1 wherein the box is fabricated from folded plastic based corrugated board.

5. An insulated animal shelter comprising:
   a) a box having at least one flap opening to expose the interior cross-section of said box, with an opening forming an entrance and exit portal in one side of said box,
   b) a plurality of substantially rigid foam panels disposed on each interior surface of said box, wherein the panel disposed adjacent to the opening on one side of said box has a corresponding opening that forms an entrance and exit portal for the insulated animal shelter, wherein an animal shelter inside said box is exposed directly to the foam insulating material without an intervening barrier,
   c) a curtain covering the entrance and exit portal, and
   d) a cushioning material disposed on the upper surface of said box.

6. An insulated animal shelter according to claim 5 and further comprising two flaps which fold down to form a side of the box, wherein the opening that forms the entrance and exit portal is disposed on a different side of said box.

7. An insulated animal shelter according to claim 6 wherein the box is fabricated from folded plastic based corrugated board.

8. An insulated animal shelter according to claim 5 wherein the curtain is a sheet of flexible plastic having a sequence of vertical slits to form a sequence of narrow flexible drapes.

9. An insulated animal shelter according to claim 5 wherein the box is fabricated from folded plastic based corrugated board.

10. An insulated animal shelter comprising:
    a) a box having at least one flap opening to expose the interior cross-section of said box, with an opening formed in one side of said box, two flaps which fold down to form a side of the box, wherein the opening that forms the entrance and exit portal is disposed on a different side of said box,
    b) a plurality of substantially rigid foam panels disposed on each interior surface of said box, wherein the panel disposed adjacent to the opening on one side of said box has a corresponding opening that forms an entrance and exit portal for the insulated animal shelter, wherein an animal shelter inside said box is exposed directly to the foam insulating material without an intervening barrier, and
    c) a curtain covering the entrance and exit portal.

11. An insulated animal shelter comprising:
    a) a box having at least one flap opening to expose the interior cross-section of said box, with an opening formed in one side of said box,
    b) a plurality of substantially rigid foam panels disposed on each interior surface of said box,
       i) wherein the panel disposed adjacent to the opening on one side of said box has a corresponding opening that forms an entrance and exit portal for the insulated animal shelter,
       ii) wherein an animal shelter inside said box is exposed directly to the foam insulating material without an intervening barrier, and
       iii) a curtain covering the entrance and exit portal,
    c) wherein the box is fabricated from folded plastic based corrugated board.

12. A kit for constructing an animal shelter, the kit comprising:
    a) a prefabricated plastic panel based corrugated board adapted to be formed into a box having a least one portal on a portion of a side surface, the portal being smaller than and laterally offset from the side of the box, and the top surface forming the roof of the shelter,
    b) a plurality of substantially rigid foam boards having dimensions corresponding to the inside dimensions of each of the side surfaces of the box to be formed from the prefabricated plastic panel, wherein at least one substantially rigid foam boards has a hole formed therein to align with the portal in the side of the box,
    c) wherein the substantially rigid foam boards are dimensioned to fit against the vertical walls of said box while being shortened in height to support another substantially rigid foam board that is intended to fit under the top surface that forms the roof of the shelter.

13. A kit for constructing an animal shelter according to claim 12, the kit further comprising a pillow for disposing at least one of on and within the fabricated box.

14. An insulated animal shelter comprising:
    a) a box having at least one opening to expose a portion of the interior cross-section of said box, the opening formed in one vertical side of said box, b) a plurality of vertically disposed substantially rigid foam panels adjacent each interior lateral surfaces of said box, c) a lower substantially rigid foam panel resting on the bottom interior surface of said box, d) an upper substantially rigid foam panel disposed adjacent the top interior surface of said box to support the exterior roof of said box, said upper substantially rigid foam panel resting on the edges of two or more of said vertically disposed substantially rigid foam panels, e) wherein at least one of said vertically disposed substantially rigid foam panels is open to dispose the same portion of the interior cross-section of said box as the opening in the box, thus forming an entrance and exit portal for the insulated animal shelter, f) wherein the box is fabricated from folded plastic based corrugated board.

15. An insulated animal shelter according to claim 14 further comprising a cushioning material disposed on the lower substantially rigid foam pane, whereby said upper substantially rigid foam panel has a thickness of at least about ¾ of an inch so as to have sufficient strength to support a small animal sitting on said cushioning material.

16. A method of sheltering a small animal, the method comprising the steps of:

a) providing a box having at least one flap opening to expose the interior cross-section of said box, with an opening formed in one side of said box, b) providing a plurality of substantially rigid foam panels, c) disposing a substantially rigid foam panel on each interior surface of said box, wherein the panel disposed adjacent to the opening on one side of said box has a corresponding opening that forms an entrance and exit portal for the insulated animal shelter, d) sheltering an animal in the box wherein the animal shelter inside said box is exposed directly to the foam insulating material without an intervening barrier, e) disposing a cushion covered with a flexible outer covering on at least one of the substantially rigid foam panel resting on the bottom interior surface of said box and the top exterior surface of the box.

17. An insulated animal shelter comprising:

a) a box having at least one opening to expose the interior cross-section of said box, the opening formed in one vertical side of said box, b) a plurality of vertically disposed substantially rigid foam panels adjacent the interior lateral surfaces of said box, c) a lower substantially rigid foam panel resting on the bottom interior surface of said box, d) an upper substantially rigid foam panel disposed adjacent the top interior surface of said box to support the exterior roof of said box, said upper substantially rigid foam panel resting on the edges of two or more of said vertically disposed substantially rigid foam panels, e) wherein at least one of said vertically disposed substantially rigid foam panels disposed adjacent to the opening on one side of said box has a corresponding opening that forms an entrance and exit portal for the insulated animal shelter, the opening being above the top of said lower substantially rigid foam panel resting on the bottom interior surface of said box, f) a cushion covered with a flexible outer covering disposed on the top of said lower substantially rigid foam panel resting on the bottom interior surface of said box.

18. An insulated animal shelter according to claim 17 wherein the box is fabricated from folded plastic based corrugated board.

19. An insulated animal shelter according to claim 17 and further comprising a cushioning material disposed on an upper surface of said box.

* * * * *